(12) United States Patent
Vikner et al.

(10) Patent No.: US 9,707,621 B2
(45) Date of Patent: Jul. 18, 2017

(54) SYSTEM FOR METAL ATOMISATION AND METHOD FOR ATOMISING METAL POWDER

(71) Applicant: Erasteel Kloster AB, Söderfors (SE)

(72) Inventors: Peter Vikner, Paris (FR); Patrik Lönnberg, Söderfors (SE)

(73) Assignee: Erasteel Klister AB, Soderfors (SE)

( * ) Notice: Subject to any disclaimer, the term of this patent is extended or adjusted under 35 U.S.C. 154(b) by 253 days.

(21) Appl. No.: 14/382,033

(22) PCT Filed: Feb. 22, 2013

(86) PCT No.: PCT/SE2013/050156
§ 371 (c)(1),
(2) Date: Aug. 29, 2014

(87) PCT Pub. No.: WO2013/129996
PCT Pub. Date: Sep. 6, 2013

(65) Prior Publication Data
US 2015/0059526 A1 Mar. 5, 2015

(30) Foreign Application Priority Data
Feb. 29, 2012 (SE) ........................................ 1250187

(51) Int. Cl.
*B22F 9/08* (2006.01)
*B22D 41/22* (2006.01)
(Continued)

(52) U.S. Cl.
CPC ............ *B22D 41/22* (2013.01); *B22D 41/14* (2013.01); *B22F 9/082* (2013.01);
(Continued)

(58) Field of Classification Search
None
See application file for complete search history.

(56) References Cited

U.S. PATENT DOCUMENTS 4,093,452 A * 6/1978 Spenceley ................. C21C 7/06
75/530
4,386,896 A * 6/1983 Ray ............................ B01J 2/04
425/7

(Continued)

FOREIGN PATENT DOCUMENTS

EP 0587258 A2 3/1994
EP 0587993 A1 3/1994
(Continued)

*Primary Examiner* — George Wyszomierski
(74) *Attorney, Agent, or Firm* — Dilworth & Barrese, LLP

(57) ABSTRACT

A system for metal powder atomization comprising a refractory lined melting furnace (1) configured to melt metal into a liquid metal bath (6), in which furnace (1) a drain (3) is arranged for draining liquid metal from the bottom of the furnace. The drain (3) is configured to be closed by a stopping member. The system comprises an atomization chamber (2) configured to receive and atomize liquid metal from the melting furnace (1). The system also comprises removal means controllable from the bottom region of the furnace (1) for removing the stopping member without interfering with the surface of the liquid metal bath (6). The removal means and the stopping member are configured such that the stopping member is removable independently of the temperature of the liquid metal bath (6) using the removal means.

17 Claims, 2 Drawing Sheets

(51) Int. Cl.
*B22D 41/14* (2006.01)
*B22F 9/00* (2006.01)

(52) U.S. Cl.
CPC . *B22F 2009/001* (2013.01); *B22F 2009/0848* (2013.01); *B22F 2009/0888* (2013.01); *B22F 2201/10* (2013.01); *B22F 2201/20* (2013.01); *B22F 2998/10* (2013.01); *Y02P 10/24* (2015.11)

(56) References Cited

U.S. PATENT DOCUMENTS

| | | | |
|---|---|---|---|
| 4,562,943 | A | 1/1986 | Freytag et al. |
| 4,770,718 | A * | 9/1988 | Verhoeven ............... B22F 9/082 264/12 |
| 4,784,302 | A * | 11/1988 | Raman ................... B22F 9/082 222/603 |
| 5,074,532 | A | 12/1991 | Ducrocq et al. |
| 5,240,513 | A * | 8/1993 | McCallum ................ B22F 1/02 148/104 |
| 5,263,689 | A * | 11/1993 | Menzies ................... B22F 9/08 266/202 |
| 5,348,566 | A | 9/1994 | Sawyer et al. |
| 6,250,522 | B1 | 6/2001 | Carter, Jr. et al. |
| 6,425,504 | B1 * | 7/2002 | Besser ................... B22D 41/08 164/457 |

FOREIGN PATENT DOCUMENTS

| | | |
|---|---|---|
| GB | 1281012 A | 7/1972 |
| GB | 1314318 A | 4/1973 |

\* cited by examiner

SYSTEM FOR METAL ATOMISATION AND METHOD FOR ATOMISING METAL POWDER

TECHNICAL FIELD OF THE INVENTION AND BACKGROUND ART

The present invention relates to a system for metal powder atomisation comprising a melting furnace with a drain arranged for draining molten metal from the bottom of the furnace. The invention also relates to a method of metal powder atomisation using such a system.

The properties of many steels and other metal alloys are easily degraded by an excess amount of oxygen and sometimes nitrogen in the alloys. For example, the bend strength and impact strength of high speed steels risk to be reduced by oxygen-rich inclusions and stainless steels have their corrosion resistance and mechanical properties degraded by high oxygen content. Certain alloys containing easily oxidisable elements such as Ti, Al, or rare earth elements are not possible to atomise at a reasonable cost in large scale using conventional powder atomisation processes due to low yield and bad predictability of the oxidising elements.

There are many different ways of producing metal powder, such as jet casting, centrifugal casting, water atomisation, oil atomisation, ultrasonic atomisation, and gas atomisation. Gas atomisation is known to produce a spherical powder with relatively low oxygen levels in comparison with powder atomised using for example water atomisation. For large scale atomisation with large batch sizes, typically several tonnes, metal is molten under air in an induction furnace. The thus obtained liquid metal is poured over spout by tilting the furnace. The metal is poured either directly into a tundish or via a ladle. The liquid metal in the tundish is then drained through an opening in the bottom of the tundish into the upper part of an atomisation chamber. Upon entry into the atomisation chamber, the liquid metal is hit by a gas at high velocity, whereby a spherical powder is produced.

During the pouring over spout from the furnace to the tundish or ladle, the entire batch of liquid metal is exposed to the surrounding atmosphere. If the surrounding atmosphere is air, the oxygen content of the liquid metal increases. In JP7048610, this problem is handled by placing a tiltable furnace and a tundish together in an enveloping chamber, in which a protective atmosphere is maintained. Thus, the liquid metal is not subjected to oxygen upon pouring over spout from the furnace to the tundish. However, this system is not adapted to use for large scale atomisation (>500 kg), since the enveloping device in this case becomes very large. It is also difficult to sample and adjust the alloy in the melting furnace inside the chamber.

Another way of handling the problem is to use a melting furnace from which the liquid metal is drained through a drain in the bottom of the furnace. The exposure of the entire batch of liquid metal to the atmosphere is thereby avoided. In order to keep the liquid metal in the furnace during melting, sampling and adjustment of the composition, a stopper rod is introduced into the drain. The stopper rod is a vertical rod operable from the top of the furnace. The stopper rod can be removed by pulling it upwards, thus opening the drain. However, it is difficult to charge the furnace without damaging or breaking the stopper rod. It is also difficult to make large scale furnaces reliably functional, since the stopper rod must be upsized with the furnace. Since the rod has to withstand high temperatures, it must be made of a refractory material. Ceramic refractory materials are typically associated with problems such as brittleness and metallic refractory materials are known to oxidise and to be very expensive.

U.S. Pat. No. 4,562,943 discloses a melting furnace with an opening in the bottom through which the melt can be poured. The opening is blocked by a closure plate, which is configured to melt as a result of heat transferred from the melt. To prevent the closure plate from melting, it is cooled from below until pouring is to be started. To start pouring, the cooling is decreased or turned off and as a result, the closure plate is melted by heat transferred from the melt and pouring is initiated. However, the high temperature gradients present in such a furnace make it very difficult to control. A too thick closure plate will be impossible to melt through by heat transfer from the melt in order to start bottom pouring. On the other hand, a too thin plate or too little cooling may start an uncontrolled bottom pouring.

SUMMARY OF THE INVENTION

It is an object of the present invention to provide an, in at least some aspect, improved system for metal powder atomisation and correspondingly an improved method for metal powder atomisation.

The present invention reaches this object by providing a metal powder atomisation system and a method. The metal powder atomisation system comprises a refractory lined melting furnace configured to melt metal into a liquid metal bath, in which furnace a drain is arranged for draining liquid metal from the bottom of the furnace, the drain being configured to be closed by a stopping member. The system further comprises an atomisation chamber configured to receive and atomise liquid metal from the melting furnace and removal means for removing the stopping member, which removal means is controllable from the bottom region of the furnace so as to enable removal of the stopping member without interfering with the surface of the liquid metal bath. The system is characterised in that the removal means and the stopping member are configured such that the stopping member is removable independently of the temperature of the liquid metal bath using the removal means.

Using the system according to the present invention, it is possible to increase the batch size since no stopper rod is needed, whereby the problems associated with upsizing the stopper rod are avoided. The stopping member used according to the present invention does not need to protrude up into the furnace and it is therefore easy to pack the furnace with raw materials before melting. By making the removal means controllable from the bottom region of the furnace, it is possible to open the drain in the furnace without interfering with the surface of the liquid metal bath and thus the introduction of oxygen into the liquid metal bath is prevented. Consequently, it is possible to obtain metal powder with lower oxygen content than that obtainable in conventional systems for atomisation. Powder obtained using the present invention used in for example hot isostatic pressing therefore give final products with low levels of unwanted impurities and therefore better mechanical properties and corrosion resistance than conventionally produced powder.

Furthermore, in the system according to the present invention, the removal means and the stopping member are configured such that the stopping member is removable independently of the temperature of the liquid metal bath using the removal means. The temperature being one of the main parameters in all metallurgical processes, it is an important feature of the system according to the present invention that draining can be initiated independently of the temperature of the liquid metal bath. This is particularly useful in the case of metallurgical processes which involve temperature variations of the liquid metal bath. It is also useful when superheating of the liquid metal bath is preferably minimised, such as when melting metals with high melting points, for example steels. Melting of the plug via superheating of the liquid metal bath would in these cases require superheating to very high temperatures, thus making it difficult to find suitable refractory materials for the furnace.

The method for atomising metal powder in a system according to the invention comprises the steps of melting metal in the furnace, draining the liquid metal from the bottom of the furnace through the drain and atomising the liquid metal in an atomisation chamber. The method is characterised in that the draining is carried out by removing the stopping member by acting thereupon from the bottom region of the furnace using the removal means in such a way that interference with the surface of the liquid metal bath is avoided. By avoiding interference with the surface of the liquid metal bath, the risk of introducing oxygen into the liquid metal bath is diminished. By using the removal means, the stopping member can be removed independently of the temperature of the liquid metal bath and there is thus no need to superheat the liquid metal bath for the purpose of removing the stopping member.

Preferred embodiments of the invention are disclosed herein.

According to a preferred embodiment, the stopping member is removable without use of heat from the liquid metal bath. The energy required for removing the stopping member is provided by external energy sources and the stopping member can thus be removed at any time.

According to one embodiment of the invention, the metal powder atomisation system is configured such that the drain is directly connected to a nozzle located in the atomisation chamber, such that the liquid metal is drained directly from the furnace into the atomisation chamber. This embodiment is well suited for alloys which are extremely sensitive to oxidation, since the exposure to atmosphere is minimal.

According to another embodiment of the invention, metal powder atomisation system further comprises a tundish and/or a ladle configured to receive liquid metal drained from the furnace and transfer it to the atomisation chamber. In a variant of this embodiment, the tundish and/or ladle may also comprise heating means for heating the liquid metal. In these embodiments, the capacity of the system is increased and it is possible to make larger batches.

According to a preferred embodiment of the invention, the stopping member is placed in the drain. The stopping member thus forms a secure plug.

According to one embodiment of the invention, the stopping member is consumable upon removal from the drain. This is practical since the stopping member does not need to be cleaned and adapted for re-use.

According to one embodiment, the stopping member is a gaseous plug. In this embodiment, the stopping member is easy to introduce and to remove and there is no risk of contamination of the liquid metal.

According to another embodiment, the stopping member is a solid plug. Using a solid plug, the furnace is easy to pack. According to one variant of this embodiment, the plug is metallic. In one embodiment, the removal means is adapted to remove the metallic plug by melting. This can be achieved by heating locally in the area of the drain using for example induction, so that the removal means can be controlled independently of the temperature of the liquid metal bath. The use of local heating makes it possible to remove the plug by melting, while minimising furnace wear and the risk of polluting the steel with inclusions and oxygen from the refractory material of the furnace.

According to another embodiment, the removal means is adapted to remove the stopping member mechanically. In a variant of this embodiment, the removal means comprises a slide gate. Such removal means provides an easy way to remove different types of stopping members.

According to still another embodiment of the invention, the refractory lined melting furnace is a refractory lined induction furnace. This is a common type of furnace to use in atomisation systems due to its high efficiency.

According to one embodiment of the invention, the furnace has a capacity to melt, in one batch, at least 500 kg of metal, preferably at least 1000 kg of metal, more preferably at least 5000 kg of metal. This enables cost efficient large scale production of metal powder.

According to one embodiment of the invention, the furnace is adapted for receiving and melting scrap metal. Thus, there is no need for high purity raw materials and the production is cost efficient.

According to one embodiment of the invention, the system is configured to produce metal alloy powder from alloys with melting temperatures above 800° C., preferably above 1200° C.

According to one embodiment, the metal powder atomisation system according to the invention further comprises protection means for protecting the surface of the liquid metal bath from contact with air. The protection means may comprise one of: an inert gas, vacuum, or slag covering the surface of the liquid metal bath. This is useful in the production of powder made from material extra sensitive to oxidation, such as alloys containing Ti, Al, or rare earth elements. Since the removal means for removing the stopping member is controllable from the bottom region of the furnace, it is easier to apply protection means than if using a conventional stopper rod, which cannot be removed without interfering with the surface of the liquid metal bath.

According to a preferred embodiment of the invention, the system comprises means for gas atomisation of the liquid metal drained from the furnace. The system in this embodiment enables production of high purity powder with very low oxygen content.

BRIEF DESCRIPTION OF THE DRAWINGS

The present invention will now be described in detail with reference to the attached drawings, wherein.

DETAILED DESCRIPTION OF EMBODIMENTS OF THE INVENTION

Figure 1:
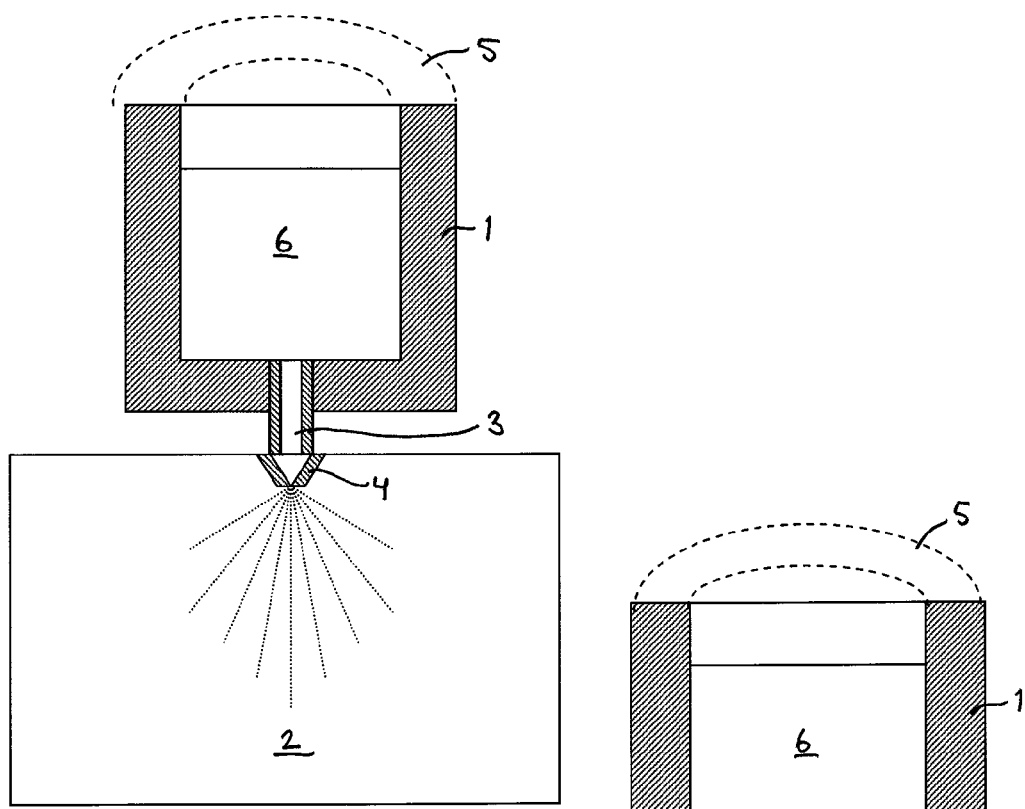
FIG. 1 shows a system for metal powder atomisation according to one embodiment of the invention.

A metal powder atomisation system, hereinafter also referred to as "a system", according to a first embodiment of the present invention is shown in FIG. 1. The system comprises a refractory lined melting furnace 1 and an atomisation chamber 2. In the bottom of the furnace 1, a drain 3 is arranged, and in connection with the drain 3, a nozzle 4 located in the upper part of the atomisation chamber 2. The drain 3 is configured to be closed by a stopping member (not shown in FIG. 1) placed in the drain. The system also comprises removal means (not shown in FIG. 1) controllable from the bottom region of the furnace 1 for removing the stopping member. The removal means is configured to be controllable independently of the liquid metal bath, in particular the temperature thereof. Preferably, the removal means is configured to remove the stopping member without use of heat from the liquid metal bath. The furnace may optionally comprise a lid member 5 for closing the furnace.

For metal powder atomisation, the stopping member is arranged in the drain 3 and the furnace 1 is loaded with metallic raw materials, for example in the form of scrap metal. If comprising a lid member 5, the furnace may be closed and optionally a protective gas can be introduced into the top region of the furnace. The material in the furnace 1 is heated and a liquid metal bath 6 consisting of molten metal results. The composition and temperature of the liquid metal bath 6 are controlled by means of sampling from the top part of the liquid metal bath 6 and are adjusted until all parameters are correct. Bottom draining of the furnace 1 is activated by, using the removal means, removing the stopping member from the drain 3. By using removal means which is controllable from the bottom region of the furnace, it is possible to remove the stopping member without interfering with the surface of the liquid metal bath 6. Upon removal of the stopping member, liquid metal flows through the drain 3, further through the nozzle 4 and into the atomisation chamber 2, where the liquid metal is atomised, e.g. by means of gas atomisation. This embodiment, where the drain 3 is directly connected to a nozzle 4 leading into the atomisation chamber 2, is especially suited for atomising alloys that are very sensitive to oxidation.

Figure 2:
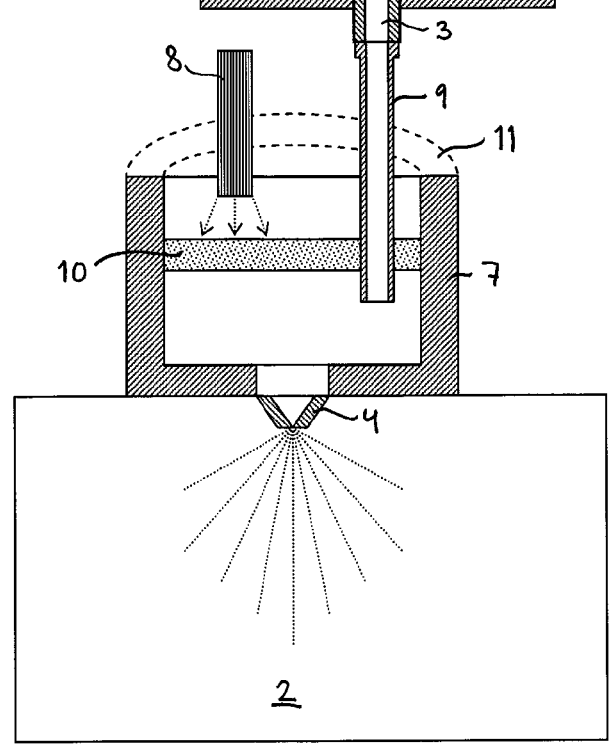
FIG. 2 shows a system for metal powder atomisation according to another embodiment of the invention.

A second embodiment of the system according to the invention is shown in FIG. 2. In this embodiment, a tundish 7 is configured to receive liquid metal drained from the furnace 1 and transfer the liquid metal to the atomisation chamber 2 via a nozzle 4 arranged in the bottom region of the tundish 7. The tundish 7 as shown comprises heating means 8 for heating the liquid metal which is contained in the tundish 7. The heating as shown is carried out using electrode heating, but also other heating means could be used, for example plasma heating, induction heating or resistance heating. A casting shroud 9 protects the liquid metal from contact with the atmosphere during transfer from the furnace 1 to the tundish 7. The tundish comprises protection means, here shown as slag 10, for protecting the surface of the liquid metal from the surrounding atmosphere. Optionally, the tundish 7 may also comprise a lid member 11 which enables maintaining of a protective atmosphere within the tundish. Instead of being drained from the furnace 1 directly into a tundish 7, the liquid metal may instead be drained into a ladle (not shown), from which the liquid metal can be transferred to a tundish before atomisation. Of course, the liquid metal does not need to be directly transferred from the furnace to the tundish or ladle, but can be transferred indirectly using for example piping. The second embodiment of the invention is well suited for efficient production of large batches of metal powder, since the draining of liquid metal from the furnace can be done significantly faster when the drain is not directly connected to a nozzle for atomisation.

The melting furnace 1 used in the metal powder atomisation system according to the invention is lined with a refractory material. Preferably this material should be chosen such that the system can produce metal alloy powder from alloys with high melting temperatures, that is, typically above 800° C., preferably above 1200° C. The furnace is preferably a refractory lined induction furnace but also other types of furnaces may be used, such as an arc melting furnace or a furnace with resistance heating. The furnace should be adapted for large scale metal powder production and thus preferably be configured for melting at least 500 kg of metal, more preferably at least 1000 kg of metal and even more preferably at least 5000 kg of metal. The metal to be melted may be in the form of scrap metal, but may also be other kinds of solids containing the elements needed to obtain the desired alloy.

The surface of the liquid metal bath in the furnace may be protected from oxygen in the surrounding air atmosphere using protection means. The protection means could for example be a layer of slag covering the liquid metal bath, or it could be a protective atmosphere maintained in the region above the liquid bath in the furnace. The protective atmosphere could be an inert gas such as Ar, or it could be a vacuum. If a tundish and/or a ladle are used, the surface of the liquid metal bath contained within the tundish and/or ladle is preferably also protected from oxygen of the surrounding atmosphere using protection means as described.

In order to prevent oxidation of the liquid metal upon draining from the furnace, the stopping member should be so arranged that it may be removed from the drain without interfering with the surface of the liquid metal bath contained in the furnace. For this purpose, removal means for removing the stopping member must be controllable from the bottom region of the furnace. The stopping member may be consumable upon removal from the drain. Such a stopping member could be a gaseous plug, a solid plug made from a metallic or ceramic material or a sand plug. The solid plug could also comprise sintered sand. The removal means could be heat applied from an external heat source, such that it is controllable independently of the temperature of the liquid metal bath and such that the plug can be removed without use of heat from the liquid metal bath. The removal means could also be mechanical. Such removal means may for example be a slide gate with two positions, of which one is an open position allowing the stopping member to be removed and one is a stopping position allowing the stopping member to be maintained in the drain. The bottom region of the furnace should here be interpreted as comprising the outer parts of the furnace below the surface level of the liquid metal bath, including any arrangements attached thereto, the drain and arrangements attached thereto.

FIG. 3-8 show melting furnaces comprised in the metal powder atomisation system according to the invention equipped with stopping members and removal means of different types. In all embodiments shown, the furnace may be configured for either direct draining of liquid metal into an atomisation chamber via a nozzle or for draining into a tundish or ladle.

Figure 3:
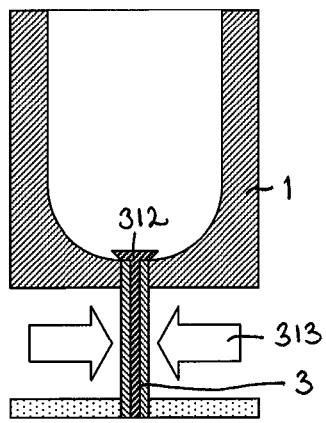
FIG. 3 shows a melting furnace according to one embodiment of the invention.

FIG. 3 shows a melting furnace 1 equipped with a drain 3 made from a ceramic or inert metal material. In the drain 3, a stopping member in the form of a metallic plug 312 is placed, preventing liquid metal from flowing out from the furnace 1. In this embodiment, the metallic plug 312 is configured to be removed from the drain by melting, using removal means in the form of heat 313 resulting from external heating from a burner, a lance, resistance or induction heating applied to the drain or directly to the metallic plug 312. When the metallic plug 312 is melted, the drain 3 is opened and liquid metal starts flowing through the drain 3 and into the atomisation chamber 2, either directly or via a tundish or ladle.

Figure 4:
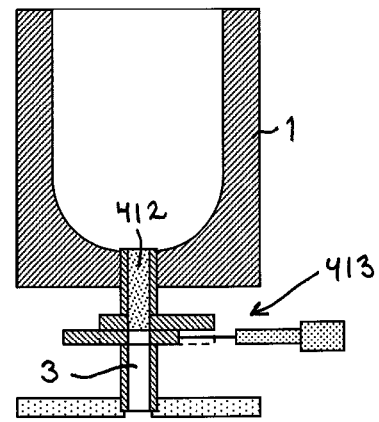
FIG. 4 shows a melting furnace according to another embodiment of the invention.

FIG. 4 shows a furnace 1 according to another embodiment of the invention. The furnace 1 is equipped with a drain 3 made from a ceramic or inert metal material. A stopping member comprising a plug 412 made of sand, for example zirconia sand, is placed in the drain 3, preventing liquid metal from flowing out from the furnace 1. The removal means comprises a slide gate 413 exhibiting an open position (as shown, right after opening with the plug still in the drain) and a closed position. The plug 412 is kept in the drain 3 by means of the slide gate 413. When in the closed position, the slide gate 413 prevents the sand from pouring out of the drain 3. The drain 3 is opened by opening the slide gate 413, whereby the sand flows out through the drain 3, thus enabling for the liquid metal to flow out of the furnace 1 and into the atomisation chamber 2, either directly or via a tundish or ladle. To prevent the sand from contaminating the liquid metal, the sand may be collected in a collection container (not shown) when exiting the drain 3.

Figure 5:
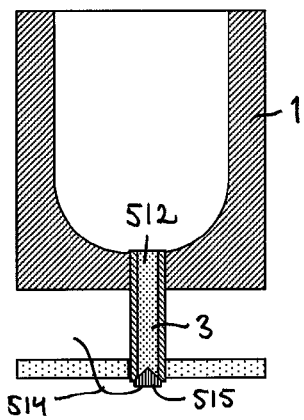
FIG. 5 shows a melting furnace according to another embodiment of the invention.

FIG. 5 shows a furnace 1 according to another embodiment of the invention. The furnace is equipped with a drain 3 made from a ceramic or inert metal material. A stopping member comprising a gaseous plug 512 is maintained in the drain 3, preventing liquid metal from flowing out from the furnace 1. The gas may be supplied from a hose 514 to a gas distributor 515 placed in the drain 3. The gaseous plug 512 is removed by removing the gas distributor, for example using mechanical removal means, thus enabling for the liquid metal to flow out of the furnace 1 and into the atomisation chamber 2, either directly or via a tundish or ladle.

Figure 6:
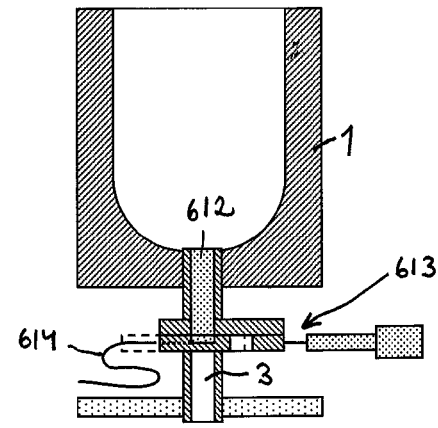
FIG. 6 shows a melting furnace according to another embodiment of the invention.

FIG. 6 shows a furnace 1 according to another embodiment of the invention. The furnace 1 is equipped with a drain 3 made from a ceramic or inert metal material. Removal means in form of a slide gate 613 is mounted in the drain 3. The slide gate 613 exhibits an open position and a stopping position (shown). In the closed position, a stopping member comprising a gaseous plug 612 is maintained in the drain 3, preventing liquid metal from flowing out from the furnace 1. The gaseous plug 612 is created by feeding gas from a hose 614 and through a porous gas distributor comprised in the stopping position of the slide gate. The gaseous plug 612 is removed by stopping the gas supply and opening the slide gate 613, thus enabling for the liquid metal to flow out of the furnace 1 and into the atomisation chamber 2, either directly or via a tundish and/or ladle.

Figure 7:
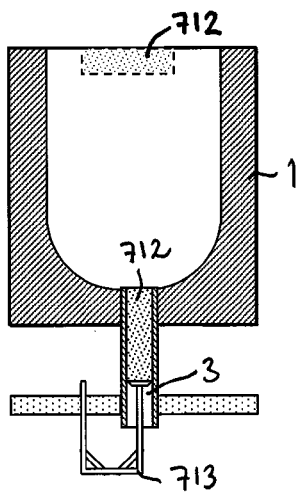
FIG. 7 shows a melting furnace according to another embodiment of the invention.

FIG. 7 shows a furnace 1 according to another embodiment of the invention. The furnace 1 is equipped with a drain 3 made from a ceramic or inert metal material. A stopping member comprising a solid plug 712 made from ceramic or metallic material is placed in the drain 3, preventing liquid metal from flowing out from the furnace 1. The drain 3 is opened mechanically by pressing the plug 712 up into the liquid metal bath in the furnace from underneath, using mechanical removal means 713. The solid plug 712 floats up to the surface of the liquid bath (dotted line), thus enabling for the liquid metal to flow out of the furnace 1 and into the atomisation chamber 2, either directly or via a tundish or ladle. As an alternative to pressing the entire plug 712 up into the liquid metal bath, the mechanical removal means and the plug may be configured such that the plug can be penetrated by the removal means. A through-hole can thus be made in the plug and liquid metal can flow out of the furnace.

Figure 8:
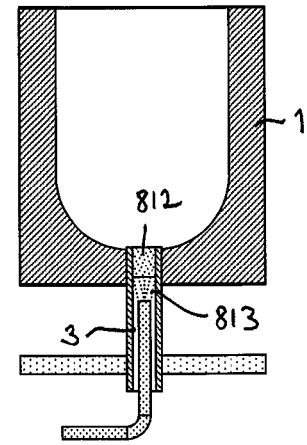
FIG. 8 shows a melting furnace according to another embodiment of the invention.

FIG. 8 shows a furnace 1 according to another embodiment of the invention. The furnace 1 is equipped with a drain 3 made from a ceramic or inert metal material. A stopping member comprising a solid plug 812 is placed in the drain 3, preventing liquid metal from flowing out from the furnace 1. The drain 3 is opened by burning the solid plug 812 away using removal means in the form of an oxygen lance 813, thus enabling for the liquid metal to flow out of the furnace 1 and into the atomisation chamber 2, either directly or via a tundish or ladle.

The invention also relates to a method of atomising metal powder in a system as described above. According to the method, metal is molten in the furnace 1, drained through the drain 3 comprised in the bottom of the furnace 1 and subsequently atomised in an atomisation chamber 2. The draining is carried out by removing the stopping member from the drain 3 in such a way that interference with the surface of the liquid metal bath 6 comprised in the furnace 1 is avoided. The liquid metal is atomised using an atomisation process such as gas atomisation, centrifugal casting, ultrasonic atomisation, oil atomisation, water atomisation or jet casting. The method is especially suitable for an atomisation process producing a powder with low oxygen content. In such a process, it may fully benefit from the high purity with respect to oxygen content achievable with the method according to the invention. An example of such a process is gas atomisation, which is known to produce low-oxygen powder. Using the method according to the present invention in combination with gas atomisation, it is possible to further reduce the oxygen content of the produced powder. The method according to two different embodiments of the invention will in the following be described as examples.

Example 1

A high speed steel with a composition of approximately (in percent by weight): 1.28% C, 4.1% Cr, 5.0% Mo, 6.4% W, 3.1% V, 0.5% Si, and balance Fe, was atomised to metal powder using a process A and a process B. Process A was a conventional production process while process B was a process according to the present invention and using a system for metal powder atomisation according to the invention.

In process A, an induction furnace from which liquid metal was poured over spout in air atmosphere into a transportation ladle was used. From the transportation ladle, the liquid metal was transferred to a tundish where it was heated using electroslag heating. From the tundish, the liquid metal was drained via a nozzle arranged in the bottom of the tundish into an atomisation chamber where it was atomised using a gas atomisation process. The oxygen content of the atomised powder was from the beginning of the atomisation process about 50 ppm, and an average oxygen level of about 25 ppm was reached after some time of atomisation.

In process B, an induction furnace was used to prepare approximately 10 tonnes of liquid steel with the above composition. The furnace comprised a drain arranged in the bottom of the furnace and a stopping member comprising a plug made from sand. The plug was held in place by a slide gate in closed position. To open the drain, the slide gate was opened and the liquid metal was drained from the furnace via a casting shroud into a tundish where it was heated using electroslag heating. The method for transferring the liquid steel from the tundish into the atomisation chamber was identical as in process A. The liquid metal was atomised using a gas atomisation process identical to the one used in process A. The oxygen content of the atomised powder was from the beginning of the atomisation process about 25 ppm, and an average oxygen level of about 20 ppm was reached after some time of atomisation.

Example 2

A steel alloy powder comprising (in percent by weight) 17% La, 4.5% Si, and balance Fe, was prepared using a system for metal powder atomisation and a process according to the present invention. An induction furnace was used to prepare a liquid metal bath and the stopping member used in the drain was a metallic plug with a composition similar to the liquid metal bath. The stopping member was removed from the drain by melting using local induction heating in the area of the drain. The liquid metal bath was held under a protective Ar atmosphere within the furnace. The liquid metal was drained directly from the furnace to a nozzle connected to the drain and into the atomisation chamber, where it was atomised using gas atomisation. Despite the fact that La is highly reactive to oxygen, it was possible to obtain a high yield.

The system and the method of the invention are preferably adapted for the production of metal alloy powder in the form of for example stainless steel or superalloy powder of different kinds. Thus, the system is preferably adapted for alloys with a melting temperature higher than 800° C., preferably higher than 1200° C.

The invention is of course not in any way restricted to the embodiments and examples described above. On the contrary, many possibilities to modifications thereof will be apparent to a person with ordinary skill in the art without departing from the basic idea of the invention such as defined in the appended claims.

The invention claimed is:

1. A metal powder atomisation system, comprising
a refractory lined melting furnace (1) configured to melt metal into a liquid metal bath (6), in which furnace (1) a drain (3) is arranged for draining liquid metal from the bottom of the furnace (1), the drain (3) being configured to be closed by a stopping member positioned in the drain and underneath the furnace (1),
an atomisation chamber (2) configured to receive and atomise liquid metal from the melting furnace (1),
a nozzle (4) situated at an end of or underneath the drain 3 and underneath the stopping member and positioned for introducing the liquid metal into the atomisation chamber (2), and
removal means for removing the stopping member, which removal means is controllable from the bottom region of the furnace (1) to enable removal of the stopping member without interfering with the surface of the liquid metal bath (6), wherein
the removal means and the stopping member are configured such that the stopping member is removable independently of the temperature of the liquid metal bath (6) using the removal means, and
the stopping member is a plug (512, 612) created by gas supplied from a hose (514, 614), a solid plug (312, 712, 812), or a sand plug (412) and the removal means are arranged to remove the stopping member mechanically without use of heat from the liquid metal bath (6).

2. A metal powder atomisation system according to claim 1, further comprising a tundish (7) and/or a ladle, the tundish and/or ladle being configured to receive liquid metal drained from the furnace (1) and transfer it to the atomisation chamber (2).

3. A metal powder atomisation system according to claim 2, wherein the tundish (7) and/or ladle comprises heating means (8) for heating the liquid metal.

4. A metal powder atomisation system according to claim 1, wherein the stopping member is consumable upon removal from the drain (3).

5. A metal powder atomisation system according to claim 1, wherein the removal means comprise a slide gate (413, 613).

6. A metal powder atomisation system according to claim 1, wherein the furnace (1) is a refractory lined induction furnace.

7. A metal powder atomisation system according to claim 1, wherein the furnace (1) has a capacity to melt, in one batch, at least 500 kg of metal.

8. A metal powder atomisation system according to claim 7, wherein the furnace (1) has a capacity to melt, in one batch, at least 1000 kg of metal.

9. A metal powder atomisation system according to claim 8, wherein the furnace (1) has a capacity to melt, in one batch, at least 5000 kg of metal.

10. A metal powder atomisation system according to claim 1, wherein the furnace (1) is adapted for receiving and melting scrap metal.

11. A metal powder atomisation system according to claim 1, further comprising protection means (5, 10, 11) for protecting the surface of the liquid metal bath (6) from contact with air.

12. A metal powder atomisation system according to claim 11, wherein the protection means comprise one of: an inert gas, vacuum, or slag (10) covering the surface of the liquid metal bath (6).

13. A metal powder atomisation system according to claim 1, additionally comprising
a tundish (7) situated underneath the drain (3) and configured to receive the liquid metal from the furnace (1),
a casting shroud (9) extending from the drain (3) into the tundish (7) and arranged to protect the liquid metal from contact with the atmosphere during transfer into the tundish (7),
an electrode (8) arranged to heat the liquid metal contained in the tundish (7), and
slag (10) positioned in the tundish (7) and above an outlet of the casting shroud (9) to protect a surface of the liquid metal from the surrounding atmosphere,
and with the nozzle (4) arranged in a bottom region of the tundish (7) and opening into the atomisation chamber (2).

14. A method of atomising metal powder in a system according to claim 1, comprising the steps of
melting metal in the furnace (1),
draining the liquid metal from the bottom of the furnace (1) through the drain (3), and
atomising the liquid metal in an atomisation chamber (2), wherein the draining is carried out by removing the stopping member by acting thereupon from the bottom region of the furnace (1) using the removal means in such a way that interference with the surface of the liquid metal bath (6) is avoided.

15. Method according to claim 14, wherein the liquid metal is atomised using gas atomisation.

16. A metal powder atomisation system, comprising
a refractory lined melting furnace (1) configured to melt metal into a liquid metal bath (6), in which furnace (1) a drain (3) is arranged for draining liquid metal from the bottom of the furnace (1), the drain (3) being configured to be closed by a stopping member positioned in the drain (3) and underneath the furnace (1),
an atomisation chamber (2) configured to receive and atomise liquid metal from the melting furnace (1),
a nozzle (4) situated at an end of or underneath the drain (3) and underneath the stopping member and positioned for introducing the liquid metal into the atomisation chamber (2), and
removal means for removing the stopping member, which removal means is controllable from the bottom region of the furnace (1) to enable removal of the stopping member without interfering with the surface of the liquid metal bath (6), wherein
the removal means and the stopping member are configured such that the stopping member is removable independently of the temperature of the liquid metal bath (6) using the removal means, and
the stopping member is a metallic solid plug (312) and the removal means are arranged to remove the solid plug (312) by melting with heat (313) resulting from external heating from a burner, a lance (813), resistance or induction heating.

17. A metal powder atomisation system according to claim 16, additionally comprising
a tundish (7) situated underneath the drain (3) and configured to receive the liquid metal from the furnace (1),
a casting shroud (9) extending from the drain (3) into the tundish (7) and arranged to protect the liquid metal from contact with the atmosphere during transfer into the tundish (7),
an electrode (8) arranged to heat the liquid metal contained in the tundish (7), and
slag (10) positioned in the tundish (7) and above an outlet of the casting shroud (9) to protect a surface of the liquid metal from the surrounding atmosphere,
and with the nozzle (4) arranged in a bottom region of the tundish (7) and opening into the atomisation chamber (2).

* * * * *